April 23, 1946.    W. A. MILLER ET AL    2,399,135
FREQUENCY DIVIDER
Filed Oct. 5, 1943    3 Sheets-Sheet 1
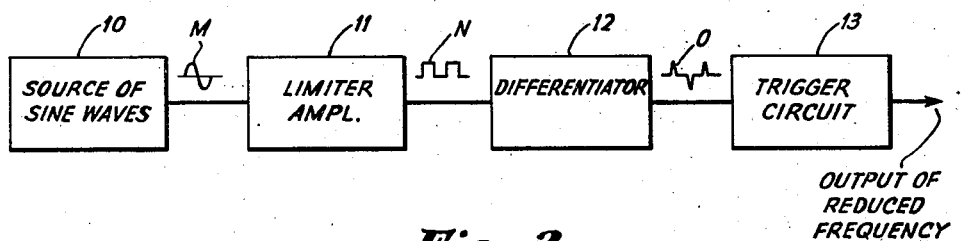
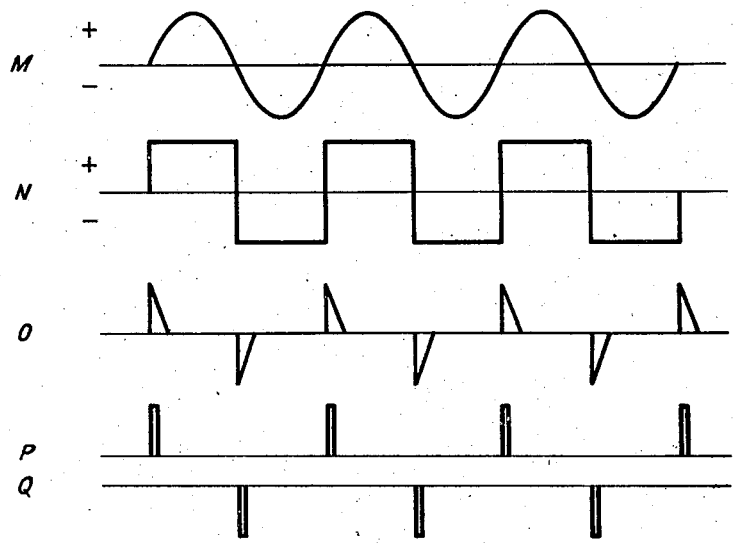
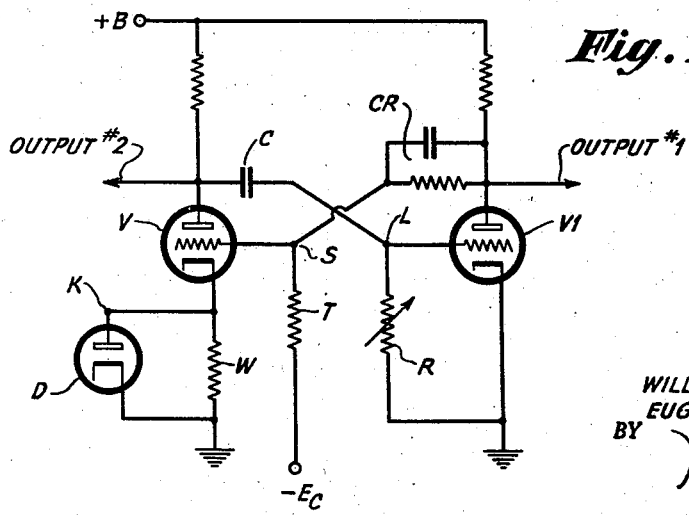
INVENTORS
WILLIAM A. MILLER
EUGENE R. SHENK
BY H. S. Grover
ATTORNEY April 23, 1946.  W. A. MILLER ET AL  2,399,135
FREQUENCY DIVIDER
Filed Oct. 5, 1943  3 Sheets-Sheet 2

INVENTORS
WILLIAM A. MILLER
EUGENE R. SHENK
BY
ATTORNEY

INVENTORS
WILLIAM A. MILLER
EUGENE R. SHENK
BY
ATTORNEY

Patented Apr. 23, 1946

2,399,135

UNITED STATES PATENT OFFICE 2,399,135

FREQUENCY DIVIDER

William A. Miller, Port Jefferson, and Eugene R. Shenk, Brooklyn, N. Y., assignors to Radio Corporation of America, a corporation of Delaware Application October 5, 1943, Serial No. 505,014

1 Claim. (Cl. 250—36)

This invention relates to a frequency divider, and particularly to a pulse responsive electrical circuit for producing pulses whose repetition rate is reduced compared to the applied pulses.

Briefly stated, the invention employs an electronic trigger circuit having a pair of electrode structures so interconnected as to have only one stable state. The time constants of this trigger circuit are so chosen that it will be tripped by an applied pulse of suitable polarity, and the trigger circuit will then remain in this tripped or active condition for a predetermined interval of time after which the trigger circuit will again become responsive to another applied pulse. Putting it in other words, an initiating or applied tripping pulse causes the trigger circuit to remain unresponsive to further applied pulses for a certain interval of time corresponding to a period covering a certain number of applied pulses. The output pulse frequency or repetition rate will then be equal to the input pulse frequency divided by the number of applied pulses impressed on the trigger circuit during its non-responsive period.

According to one embodiment of the invention, a pulse of one polarity is employed to trip the trigger circuit, while a pulse of another polarity is employed to restore the trigger circuit to its normal stable state, after the lapse of a desired interval of time, thus rendering the trigger circuit responsive to a succeeding tripping pulse of suitable polarity. Such an arrangement produces pulses whose frequency or repetition rate has an integral submultiple relation to the frequency or repetition rate of the applied pulses.

According to another embodiment of the invention, the trigger circuit restores itself to the stable state after a desired interval of time and independently of any pulse applied subsequent to the tripping pulse. Such an arrangement also produces pulses whose frequency bears a submultiple relation to the frequency or repetition rate of the applied pulses.

A more detailed description of the invention follows in conjunction with the drawings, wherein:

Fig. 1 illustrates, in box form, one embodiment of an electrical circuit for performing the invention;

Fig. 2 illustrates the details of the trigger circuit of Fig. 1;

Figure 4:
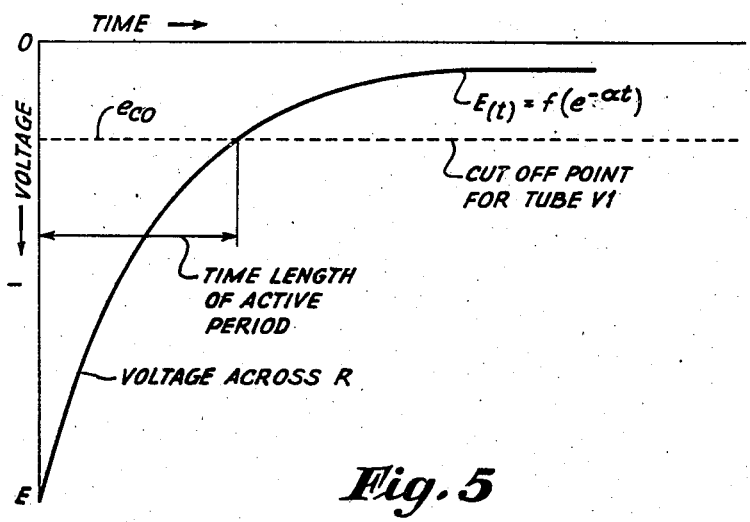
Figure 5:
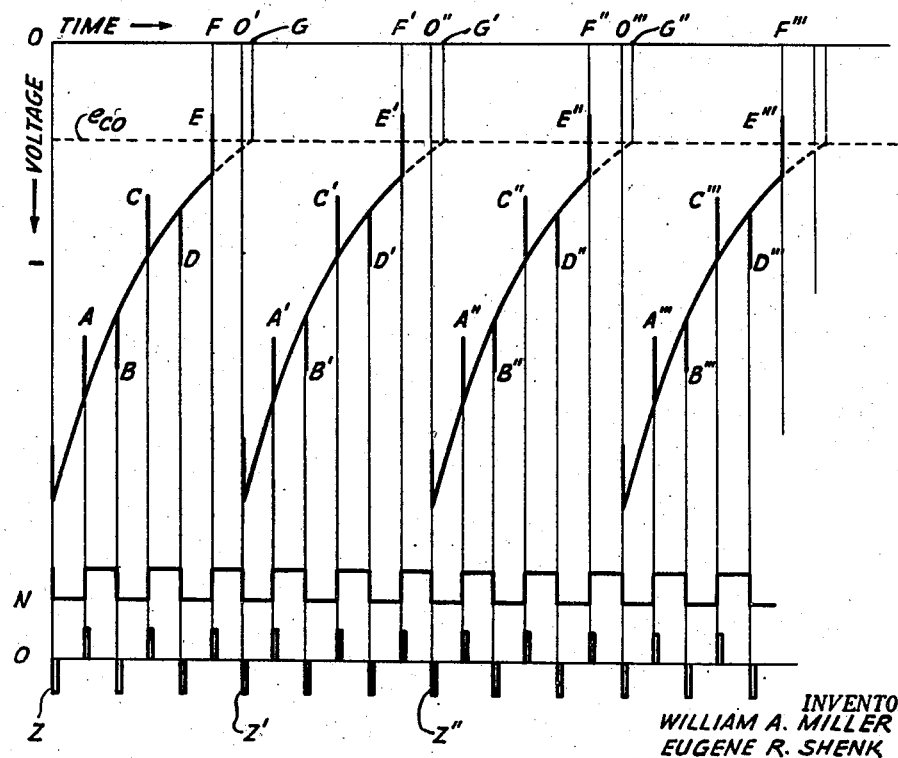
Figure 6:
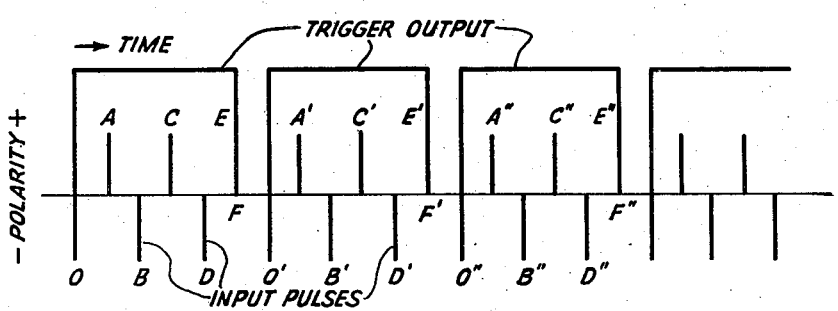
Figure 7:
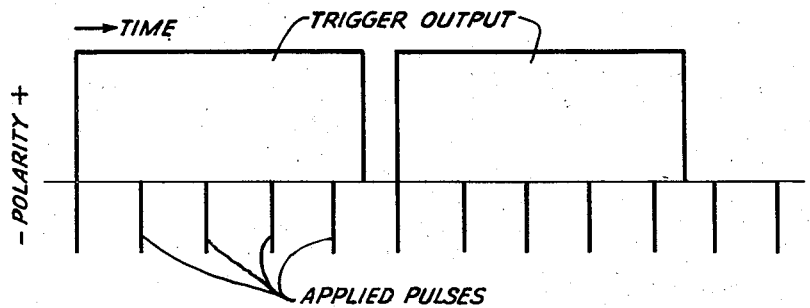

Fig. 3 graphically illustrates different voltage wave forms appearing in various parts of the system of Fig. 1;

Fig. 4 graphically illustrates the normal operation of the trigger of Fig. 2;

Fig. 5 graphically illustrates the operation of the trigger of Fig. 2 in the system of Fig. 1 under the influence of applied pulses whose frequency is to be divided;

Fig. 6 is another graphical illustration of the operation of the system of Fig. 1 showing input and output pulses superimposed; and Fig. 7 is a graphical illustration of input and output pulses superimposed, given in explanation of another embodiment of the invention.

Referring to Fig. 1, there is shown one embodiment of a frequency divider system of the invention for providing an output in the form of pulses whose repetition rate is an integral submultiple of the applied pulses. This system includes, by way of example only, a source of sinusoidal waves 10 followed by an electron discharge device limiter amplifier 11, in turn followed by a differentiator 12 in order to produce a series of impulses. The voltage wave forms appearing in the output circuits of the different pieces of apparatus 10, 11 and 12 are illustrated immediately over the associated connections and labeled M, N and O. These wave forms and their phase relations are developed in more detail in Fig. 3. An important feature of the combination of elements constituting the invention involves the trigger circuit 13 to which is applied the impulses from the differentiator 12, and whose output contains the pulses of reduced frequency.

The trigger circuit 13 is illustrated in more detail in Fig. 2. This circuit is an unsymmetrical arrangement comprising a pair of vacuum tubes V and VI which, if desired, could be included within a single evacuated envelope. The grid and anode electrodes are interconnected to provide a regenerative action. The anodes are supplied with positive polarizing potentials from source B through separate resistors, as shown. The anode of tube V is connected to the grid of tube VI through a condenser C, while the anode of VI is connected to the grid of tube V through a resistor-shunt condenser arrangement CR. The grid of tube V is connected to the negative terminal EC of a source of biasing potential through a resistor T. The grid of tube VI is connected to ground through an adjustable resistor R. The cathode of tube V is connected to ground through a relatively high resistor W, in turn shunted by a diode D. This diode is an open circuit for any negative input pulse applied to terminal K, and serves to quickly dissipate such an input pulse applied to this terminal.

Normally, in the operation of the trigger circuit of Fig. 2, tube V is non-conductive and biased to cut-off by means of source EC. Tube VI, however, is normally in a conductive state and passes current because its grid is maintained at or near zero bias. This condition of operation wherein tube V is normally non-conductive and tube VI is normally conductive is called the stable state. In the active or tripped state, however, the current passing conditions of the tubes V and VI are reversed from that just described. After an interval of time in the active state, depending in part upon the time constant of condenser C and resistor R, the trigger will restore itself to the stable state. In order to change the trigger circuit from the stable state to the active state, it is necessary to apply a negative pulse to terminal K or L or a positive pulse to terminal S. These pulses should, of course, have sufficient magnitude to trip the trigger circuit; that is, to reverse the current passing conditions of the two tubes V and VI. As an illustration, a pulse which will overcome the negative bias on the grid of tube V will cause this tube to pass current, and by virtue of the regenerative action of the circuit will cause tube VI to cease conducting. In the stable state of the trigger circuit, condenser C will be charged to the full value of the potential B, whereas in the active state of the trigger circuit, the condenser C will discharge over a circuit including resistor R and also through the anode impedance of tube V in parallel with the anode resistor of tube V. When the charge on condenser C has dissipated to a critical value, such that its discharge current no longer develops sufficient voltage across resistor R to maintain the tube VI biased at or beyond plate current cut-off, then the current conductive states of the two tubes will be reversed and the trigger circuit will be restored to the stable state. Rectangular wave output pulses are obtainable from either of the anodes of tubes V or VI, but of different polarity.

The trigger circuit referred to may be of the type described in our copending application Serial No. 492,872, filed June 30, 1943.

The operation of the trigger circuit of Fig. 2 may be more readily understood from the graphical representation of Fig. 4 showing the grid characteristics of tube VI. The ordinate represents grid voltage, while the abscissa represents time. Normally, in the stable state, the grid of VI has a voltage near zero, or appreciably above the critical cut-off point for this tube represented by the horizontal dash-line $e_{co}$. When the trigger circuit is tripped by an initiating pulse, the voltage on the grid of tube VI goes negative by the amount E, and for good, reliable trigger action, this voltage must be further negative than $e_{co}$, the "cut-off" grid bias potential of tube VI. The exponential curve $E(t)$ illustrates how the charge on condenser C gradually leaks off through its associated resistor network. When the trigger is tripped it will remain in the active state until the voltage $E(t)$ has "drooped" to the cut-off line $e_{co}$, at which time tube VI will conduct and end the active period of the trigger. The trigger circuit will then be restored to its stable state.

In the operation of the embodiment of Fig. 1, it is proposed to apply pulses of relative positive and negative polarities to terminal L of the trigger. It is immaterial for the purpose of the present invention how these pulses are obtained, although apparatus 10, 11 and 12 show one way in which they can be derived from a source of sinusoidal waves. Fig. 3 illustrates in curve M the voltage wave form derived from source 10. Curve N shows the essentially square voltage wave to which the sine wave is converted by limiter apparatus 11. The sharp impulses O illustrate the peaked waves produced by the differentiator 12 from the slopes of the square waves N. It is these pulses of wave form O that are applied to terminal L of the trigger circuit in the embodiment of Fig. 1. Wave forms P and Q illustrate the results of rectification, by means of half wave rectifiers, of the pulses of wave form O. The pulses of wave forms P and Q are not utilized in the system of Fig. 1, and are mentioned later in connection with another embodiment of the invention.

By applying pulses like those shown by wave form O of Fig. 3 to terminal L corresponding to the grid of tube VI of the trigger circuit, the potential on the grid of tube VI will vary as shown in Fig. 5. The wave form O and the wave form N are shown at the bottom of Fig. 5. In Fig. 5, three cycles of operation are shown. At the time 0, the first negative pulse Z of a magnitude sufficient to bias tube VI to cut-off, is impressed on the trigger of Fig. 1 causing the active period of this trigger to begin. The value of condenser C and its associated resistors are adjusted until the trigger circuit would normally return to its stable state at time G. However, the pulses A, B, C, D and E are applied to the grid of tube VI and (as shown) all pulses but E have no effect on the operation of the trigger. It is seen that pulse E, which is of positive polarity, is of sufficient magnitude to swing the grid voltage of tube VI more positive than the cut-off potential $e_{co}$. This causes tube VI to draw anode current thus shutting off or restoring the trigger circuit at time F by virtue of regenerative action of tube V on tube VI and vice versa. It should be noted that time O—F is less than time O—G. The trigger will remain in its restored or stable state until the next negative pulse Z' occurring at time O' returns the trigger to the active state, and the cycle of operations is repeated with the positive pulse E' turning off the trigger, etc. By adjusting the time constant of condenser C and resistor R, it is possible to count down in frequency by various integral numbers.

In Fig. 6, we show an idealized indication of input and output pulses superimposed. In both Figs. 5 and 6 the division factor is 3. It should be understood that although the trigger output pulses shown in Fig. 6 are positive, negative output pulses are also directly obtainable. Pulses of positive direction are obtainable from the anode of tube VI, while pulses of negative direction are obtainable from the anode of tube V.

It will be seen from an inspection of Fig. 5 that for the case illustrated the trigger circuit is tripped or active for two and one-half times the period of the applied pulses and stable for one-half the period of the applied pulses. There is thus obtained a frequency division of three. By suitable adjustment of the time constants with relation to the frequency of the input pulses, it is possible to obtain any suitable sub-multiplication from the trigger.

The advantage of the system of Fig. 1 as explained by Figs. 5 and 6 is that the trigger circuit has no free period as a multivibrator has; that is, no output will be obtained from the trigger circuit if no input pulses are supplied. Also, that the start of an initiating pulse is utilized to trip the trigger, while the end of another pulse is utilized to restore the trigger to the stable state.

Instead of applying pulses of opposite polarity to trip the trigger and to restore the trigger prior to the time it would normally restore itself, as described above, the trigger of the invention can be used as a frequency divider or reducer merely by applying thereto input pulses of only one polarity. Thus, positive pulses of the type illustrated in line P of Fig. 3 can be applied to terminal S of tube V of the trigger circuit (Fig. 2) or, alternatively, negative pulses of the type illustrated in line Q of Fig. 3 can be applied to terminal K of tube V of the trigger circuit. The time constants of the trigger circuit (i. e., principally condenser C and resistor R) are then so adjusted that the trigger circuit restores itself to the normal or stable state after an interval of time overlapping $n$ pulses. Thus, an initiating pulse will trip the trigger circuit, and the trigger circuit will then restore itself to the stable state after the lapse of two, three, four or five applied pulses; for example, whichever is desired. The trigger circuit will then be in condition to trip again. We can thus obtain a frequency divider of any suitable submultiple of the applied pulses. In such an arrangement, however, the time constants of the trigger circuit must be so adjusted that the trigger circuit restores itself at a time between the occurrence of two applied pulses. This may be clearly seen from an inspection of Fig. 7 which illustrates that an output pulse is obtained for every four applied pulses. Although the trigger output pulse is shown in the positive direction, and this will be the case if output #1 lead is employed in Fig. 2, the output pulse may be in the negative direction if output #2 lead is employed in Fig. 2. Of course, both output leads may be utilized simultaneously to obtain submultiple frequency pulses of opposite polarities.

What is claimed is:

A pulse frequency divider comprising a trigger circuit having a pair of unsymmetrically biased interconnected vacuum tube electrode structures, one of which is normally conductive and the other of which is non-conductive in the stable state, and vice-versa in the active state, a resistor shunted by a rectifier connected between the cathode of said normally non-conductive vacuum tube electrode structure and ground, means for applying periodically recurring pulses of negative polarity to said cathode to thereby change said trigger circuit from its stable to its active state, said trigger circuit having impedance elements of such values and so adjusted as to restore the aforesaid stable state after the lapse of a time interval overlapping a desired number of said recurring pulses and at a time between the occurrence of two of said pulses, and a connection to the output electrode of one of said tubes for deriving output pulses of a frequency which is a submultiple of the frequency of the applied recurring pulses.

WILLIAM A. MILLER.
EUGENE R. SHENK.